April 17, 1956 T. E. BELSHAW ET AL 2,742,198
DOUGH DISPENSING MACHINE
Filed Sept. 18, 1953 2 Sheets-Sheet 1

INVENTOR.
THOMAS E. BELSHAW
WALTER R. BELSHAW
BY Barnes & Seed
attys.

INVENTOR.
THOMAS E. BELSHAW
WALTER R. BELSHAW

United States Patent Office 2,742,198
Patented Apr. 17, 1956

2,742,198

DOUGH DISPENSING MACHINE

Thomas E. Belshaw and Walter R. Belshaw, Seattle, Wash.

Application September 18, 1953, Serial No. 381,093

10 Claims. (Cl. 222—287)

The present invention relates to a dough dispensing machine, and more particularly to a machine which will dispense a predetermined quantity of dough or the like and in which the amount dispensed can be varied at will. The machine is designed to utilize the adjustable cam lever drive mechanism shown in prior U. S. Patent No. 1,738,033, and later patents.

When "hi-ratio" bakery recipes are used the resulting dough is very thin, like hot cake batter, and of course, it contains nuts and fruits which further complicates the dispensing problem. The present invention is particularly aimed at providing a device which will rapidly and accurately dispense such relatively thin dough, with or without nuts and fruits, in measured quantities which may be varied at will. In carrying out this aim the invention has as a further objective the providing of a dough dispensing mechanism which assures that each dispensed charge of dough will clearly separate therefrom.

Various other and ancillary objects and advantages of the invention will become apparent from the following description of an illustrative embodiment of the invention and explanation of the manner of its use.

Figure 4:
Figure 4 is an enlarged fragmentary view, partly in section, intended to show the cavity at the lower end of the stationary valve element.
Figure 5:
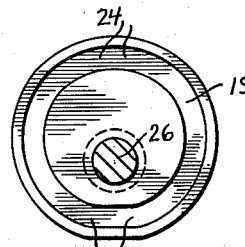
Figure 5 is a front elevational view of one of the cams, the shaft in which it is mounted being shown in section.
Figure 1:
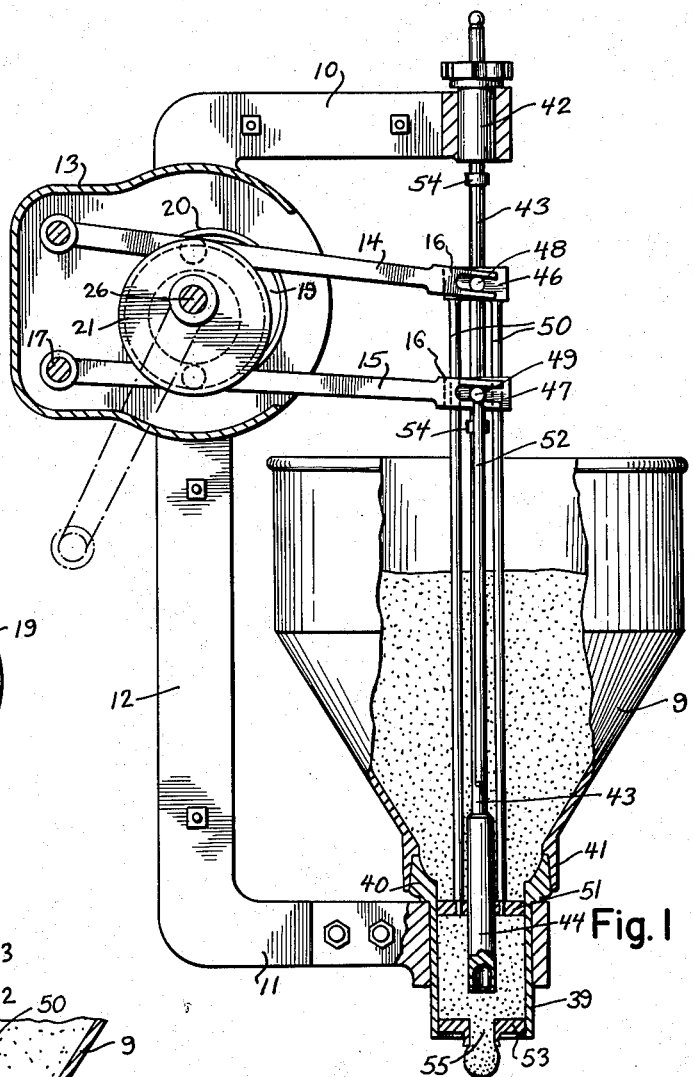
Figure 1 is a side elevational view, partly in vertical section, of our dough dispensing machine.

Figures 8 through 13 schematically illustrate various positions of the pistons during the operation of the machine.

Referring more particularly to the drawings, it is seen that the supporting frame for my invention includes a pair of complementary castings which when aligned and bolted together, define upper and lower arms 10, 11 extending forwardly from a vertical central frame section 12. Near its upper end, this central section is formed to provide a casing 13 open at its forward end for the operation of a pair of vertically spaced cam levers 14, 15. These levers are laterally bifurcated at their outer ends and each half of the resulting bifurcations is in turn vertically bifurcated so that each cam lever has two pairs of forks 16. The other ends of the levers are pivoted within the casing 13, as at 17. Intermediate their ends the levers carry laterally disposed and fixedly secured pins on which rollers 18 are freely journaled for riding in respective grooves 19 of a pair of cams 20, 21. The cams are arranged with their grooves facing one another and are formed with oppositely extending elongated hubs 22, 23 placed eccentrically of the grooves which are generally circular. Each of the grooves is formed with rests 24, 25 disposed at diametrically opposite sides thereof.

A shaft 26 extends through the hubs 22, 23 and is secured at one end to the former by a pin 27 so that the cam 20 is rotatable with the shaft. Fixedly secured to the other end of the shaft and externally of the casing is a handle crank 28. The latter is formed at its inner end with a pointer 30 and is partially split as at 31 so that a bolt 32 extending through the split portion can effectively clamp the crank to the shaft 26. An indicator member 33, having a body portion also split, encircles the hub 23 of the cam 21 and is clamped thereto by a bolt 34. Said member 33 carries a scale 35 at one end arranged to cooperate with the pointer 30, and carries at its other end an arcuate slot 36 in which a bolt 37 is slidably mounted. This bolt extends by its threaded end out through an aperture in the crank and carries a wing nut 38. It is readily seen that when this wing nut is loosened, the two cams 20, 21 can be turned with respect to one another within the limits of the slot 36 the amount of adjustment being indicated by the pointer 30 and scale 35 since they are each secured relative to a respective one of the cams.

The free end of the lower frame arm 11 is formed with a circular socket for receiving a cylinder 39 having an enlarged externally beveled bead portion 40. Seated in the latter is a mating internally beveled outlet portion 41 of a hopper 9. In a similar manner, the upper frame arm 10 has a socket in which is seated a bushing 42 carried at the head end of a downwardly extending and normally stationary guide rod 43. An elongated foot end portion of this guide rod is uniformly enlarged in diameter to serve as a stationary valve element 44, and the extreme foot end of this valve element is formed with a downwardly opening cavity 45, the purpose of which will be hereinafter explained.

Centrally journaled for endwise movement in the upper portion of the guide rod 43 between a spaced pair of stop collars 54 are upper and lower blocks 46, 47 from which respective pairs of trunnions 48, 49 project laterally. These trunnions are straddled by the pairs of forks 16 of the cam levers 14, 15. The lower block 47 has vertical bores adjacent its ends for receiving a pair of parallel piston rods 50 rigidly depending from the upper block 46 at both sides of the guide rod 43. At their lower end these piston rods 50 carry an upper piston 51 which is centrally journaled for endwise movement on the valve element 44. A second pair of piston rods 52 are rigidly connected to the ends of the lower trunnions 49 outwardly of the forks 16 of the lower cam lever 15 and they extend downwardly to a lower piston 53. It will be self-evident that the upper and lower pistons have outside diameters corresponding to the inside diameter of the cylinder 39.

Figure 2:
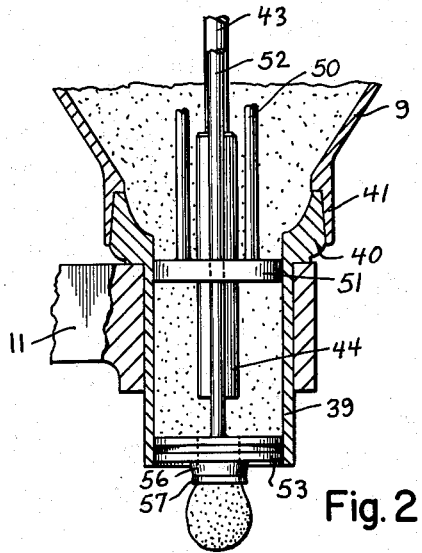
Figure 2 is an enlarged fragmentary view, partly in vertical section, particularly illustrating the piston assemblies.
Figure 3:
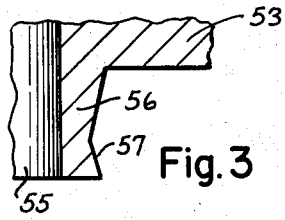
Figure 3 is an enlarged vertical sectional view particularly illustrating the depending flange of the lower piston.
Figure 6:
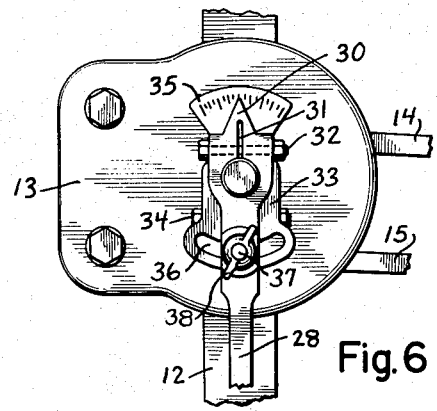
Figure 6 is a fragmentary side elevational view showing the cam adjusting means.
Figure 7:
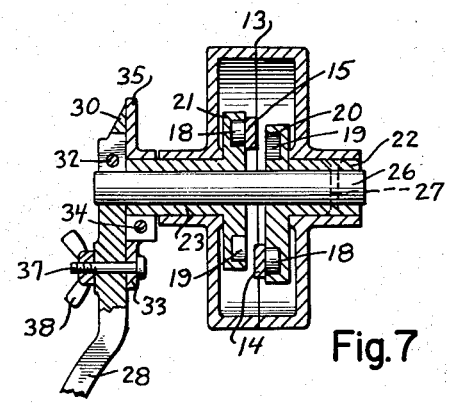
Figure 7 is a vertical sectional view of the cam assembly and driving mechanism.
Figure 8:
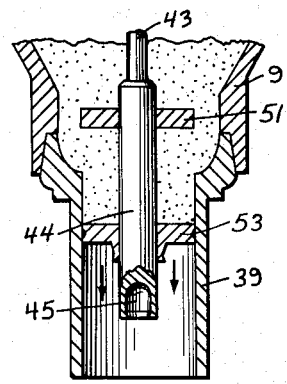
Figure 9:
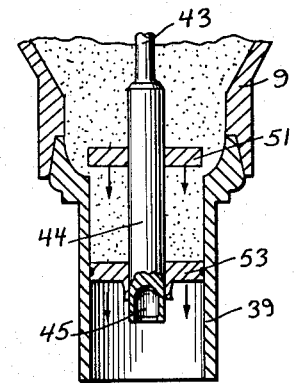
Figure 10:
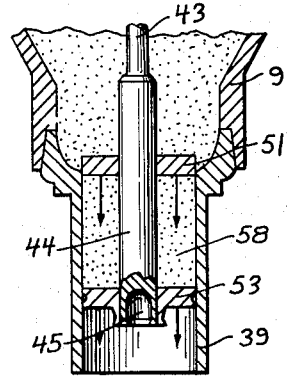
Figure 11:
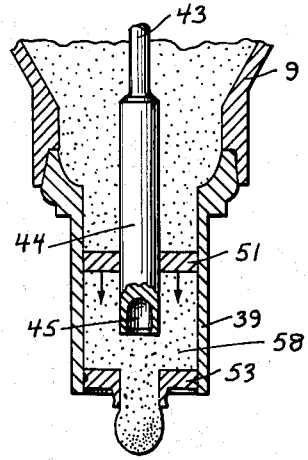
Figure 12:
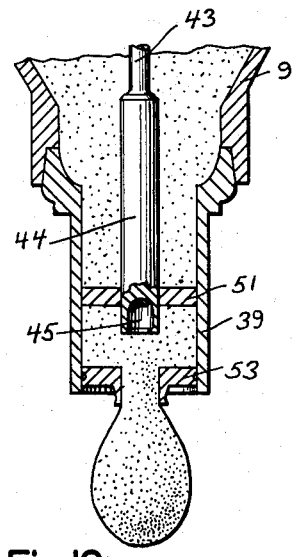

Directing attention particularly to Figures 2 and 3, it is seen that the lower piston 53 has a central through bore 55 serving primarily as a discharge opening and having a diameter such that the lower piston can move upwardly over the valve element 44. A depending flange 56 encircles the lower end portion of the bore 55 and desirably terminates externally with an outwardly beveled skirting face 57 (Figure 3). This skirting face intersects the end face of the flange at an acute angle and is designed to prevent dough from clinging to the lower piston.

A complete cycle of the operation of the machine is shown in Figures 8 to 13, starting with the upper piston 51 at its upper limit of travel when the cam 20 is at its larger rest 24 and with the lower piston 53 starting downwardly from its upper limit corresponding to the shorter rest 24 of the respective cam 21. At this time the upper piston is above the cylinder 39 so that dough in the hopper 9 is free to enter the upper end of the cylinder when drawn by the suction effect due to the pistons moving apart. Thereafter the pistons move downwardly together, as in Figure 9, and dough is free to pass from the hopper into the cylinder until the upper piston reaches the Figure 10 position closing off the cylinder from the hopper and trapping a charge 58 of the dough between the pistons. The latter, with the trapped dough charge therebetween, continue their downward travel together until the lower piston 53 leaves the valve element 44 and reaches the foot of the cylinder 39 (Figure 11) at which time the lower piston comes to a comparative standstill for an interval caused by the rest 24 of the cam 21. Meanwhile the upper piston continues to move downwardly toward its lower limit of travel (Figure 12), and hence the charge of dough between the pistons is compressed causing much of the dough charge to be forced down through the discharge opening 55 in the lower piston. When the upper piston reaches its lower limit the respective cam 20 is at its shorter rest 23 so that the two pistons rise substantially together from their lower limits of travel. The discharge of the dough from the discharge opening 55 continues until the opening is closed by the stationary valve element 44.

Figure 13:
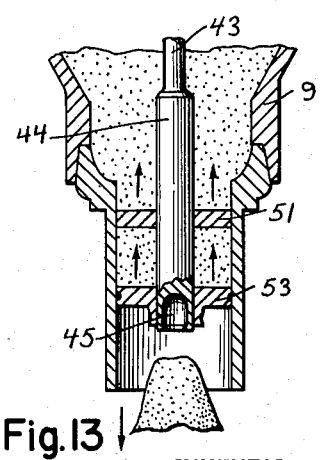

Just prior to the showing of Figure 13, the cavity 45 at the lower end of the valve element performs its intended function, and namely to insure that the dough will free itself from the valve. To obtain a ready understanding of how the cavity accomplishes this function, attention is directed to the fact that as the lower piston moves from the Figure 10 to the Figure 11 position air is trapped within the cavity by the dough. Furthermore this trapped air will normally be somewhat compressed as the dough is compressed between the two pistons. Accordingly, when the discharge opening 55 is closed by the valve element the last portion of dough at the lower end of the valve element is clearly separated by a sudden release of the trapped air in the cavity 45.

As before mentioned, the two cams 20, 21 can be turned with respect to one another after loosening the wing nut 38. It will be evident that if the grooves 19 in the cams were in spaced alignment, that is, with the parts of one cam in registration with the corresponding parts of the other cam, the movements imparted to the cam levers 14, 15 through the rollers 18 and transferred to the pistons by the piston rods, would be equal at all times at any position of the crank 28, and hence the pistons would move in unison with the consequences that dough would be carried up and down in the cylinder 39 without any compressive action thereon. Now by adjusting one of the cams so that one section of its groove is advanced ahead of the like section in the other cam, it is seen that while one roller is in a section at rest the other roller will be descending to give relative motion between the pistons and thereby accomplish a suction of the dough into the cylinder from the hopper while the lower piston is at rest at the top of its stroke and a compression thereof between the pistons to force the dough out through the discharge opening in the lower piston while the latter is at rest at the bottom of its stroke. The amount of dough trapped between the pistons during each down stroke of the pistons is perforce dependent upon the maximum distance the pistons move apart before the upper piston closes off the hopper from the cylinder, and so it is determined by the degree of advancement of one cam over the other.

While we have shown one embodiment of our invention, we may, however, provide other arrangements and constructions for carrying out the invention without departing from the spirit or scope of the same as defined by the appended claims.

What we claim is:

1. In a dough dispensing machine, a cylinder having an inlet end and a discharge end, a valve element extending from one of its ends longitudinally into the cylinder from the said inlet end and terminating by its other end short of the said discharge end, a first piston mating with the bore of the cylinder and having a discharge opening therethrough mating with the said valve element, said piston being mounted for reciprocating movement within said cylinder between an intake limit of travel whereat the said discharge opening is closed by said valve element and a discharge limit of travel whereat the said piston is completely withdrawn from the valve element, a second piston mating with the cylinder bore and journaled on the valve element for reciprocating movement between an intake limit of travel out of the inlet end of the cylinder and a discharge limit of travel within the cylinder, and drive means for reciprocating the pistons between their respective said limits of travel and for closing the distance between the pistons while the valve element is out of the said discharge opening.

2. In a dough dispensing machine, a cylinder having an inlet end and a discharge end, a valve element extending from one of its ends longitudinally into the cylinder from the said inlet end and terminating by its other end short of the said discharge end, said valve element being stationary with respect to said cylinder, a first piston mating with the bore of the cylinder and having a discharge opening therethrough mating with the said valve element, said piston being mounted for reciprocating movement within said cylinder between an intake limit of travel whereat the said discharge opening is closed by the said valve element and a discharge limit of travel whereat the said piston is completely withdrawn from the valve element, a second piston mating with the cylinder bore and journaled on the valve element for reciprocating movement between an intake limit of travel out of the inlet end of the cylinder and a discharge limit of travel within the cylinder, and drive means for reciprocating the pistons between their respective said limits of travel and for closing the distance between the pistons while the valve element is out of the said discharge openings.

3. In a dough dispensing machine, a piston having a discharge opening therethrough with inlet and discharge ends and providing a boss-like flange extension circumscribing the said discharge end, the outer external face of said flange extension beveling outwardly through at least part of its length and having said bevelled portion intersecting the terminal end face of the said flange extension at an acute angle, a plunger valve element mating with the said discharge opening and having a cavity opening to one of its ends, and means for imparting relative reciprocating movement between the said valve element and piston between one limit of travel whereat the valve element is spaced by its cavitied end from the inlet end of the piston and a second limit of travel whereat the valve element extends by its cavitied end through the said discharge opening.

4. In a dough dispensing machine, a guide rod, a pair of parallel blocks centrally journaled for reciprocating endwise movements on the guide rod, a pair of parallel piston rods connected to one of the blocks at diametrically opposite sides of the guide rod and extending freely through the other block in parallel relation to the guide rod, and a second pair of parallel piston rods interconnected with said other block and extending at diametrically opposite sides of said guide rod in positions parallel to the first-named pair and removed ninety degrees therefrom when considered in a plane normal to all of said rods.

5. In a dough dispensing machine, a guide rod, a pair of blocks journaled for endwise reciprocating movements on the guide rod, a first piston rod connected to one of the blocks and extending freely through the other block in parallel spaced relation to the guide rod, a second piston rod free of the first-mentioned block and interconnected with said other block in parallel spaced relation to both the first said piston rod and the guide rod.

6. In a dough dispensing machine, a guide rod, a pair of blocks journaled for endwise reciprocating movements on the guide rod, a first piston rod connected to one of the blocks and extending freely through the other block in parallel spaced relation to the guide rod, a first piston carried by the said first piston rod endwise of both said blocks, a second piston rod connected to said other block in parallel spaced relation to the said first piston rod and extending freely through the said first piston, and a second piston endwise of both blocks and said first piston and carried by said second piston rod.

7. In a dough dispensing machine, a guide rod formed with a valve element at one end thereof, a pair of blocks journaled for endwise reciprocating movements on the guide rod, a first piston rod interconnected with the block furthest from said valve element and extending freely through the other block in parallel spaced relation to the guide rod, a first piston carried by the said first piston rod and journaled for endwise reciprocating movements on said valve element, a second piston rod interconnected by one end with said other block in parallel spaced relation to the said first piston rod and extending freely through the said first piston by its other end, and a second piston aligned with the said first piston and carried by said other end of the said second piston rod, said second piston having an endwise discharge opening therethrough aligned and mating with said valve element.

8. In combination with the structure of claim 7, means for imparting independent reciprocating movements to said blocks such that the said second piston is responsively opened and closed by said valve element and said first piston moves toward said second piston while the latter is free of the valve element.

9. In combination with the structure of claim 8, means for selectively varying the maximum distance that the blocks move apart during said reciprocating movements.

10. In a dough dispensing machine, a valve element, a piston centrally journaled on said valve element for endwise movement with respect thereto, a pair of piston rods connected to the piston at diametrically opposite sides of the valve element and disposed parallel to one another and to the valve element, a second pair of piston rods disposed parallel to one another and to the valve element at diametrically opposite sides of the valve element and freely extending endwise through the said piston at points ninety degrees removed from the other said piston rods, and a second piston connected to the said second pair of piston rods in a position aligned with the first said piston.

References Cited in the file of this patent

UNITED STATES PATENTS

| | | |
|---|---|---|
| 1,738,033 | Belshaw | Dec. 3, 1929 |
| 1,776,680 | Carpenter | Sept. 30, 1930 |
| 1,782,596 | Beilgard | Nov. 25, 1930 |
| 1,856,511 | Schoel | May 3, 1932 |
| 2,210,278 | Carpenter | Aug. 6, 1940 |
| 2,405,903 | Premas | Aug. 13, 1946 |
| 2,553,264 | Lycke | May 15, 1951 |